Aug. 23, 1949.  H. F. PORTER  2,479,775
APPARATUS FOR DRESSING FOWL
Filed Aug. 15, 1946  2 Sheets-Sheet 1
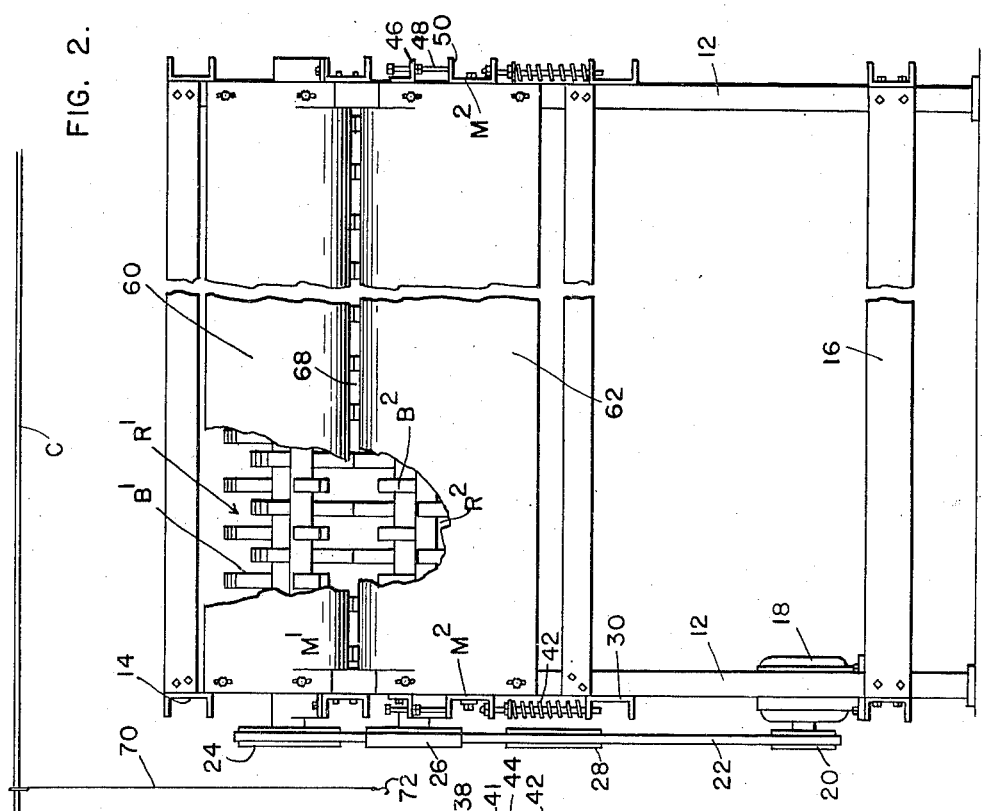
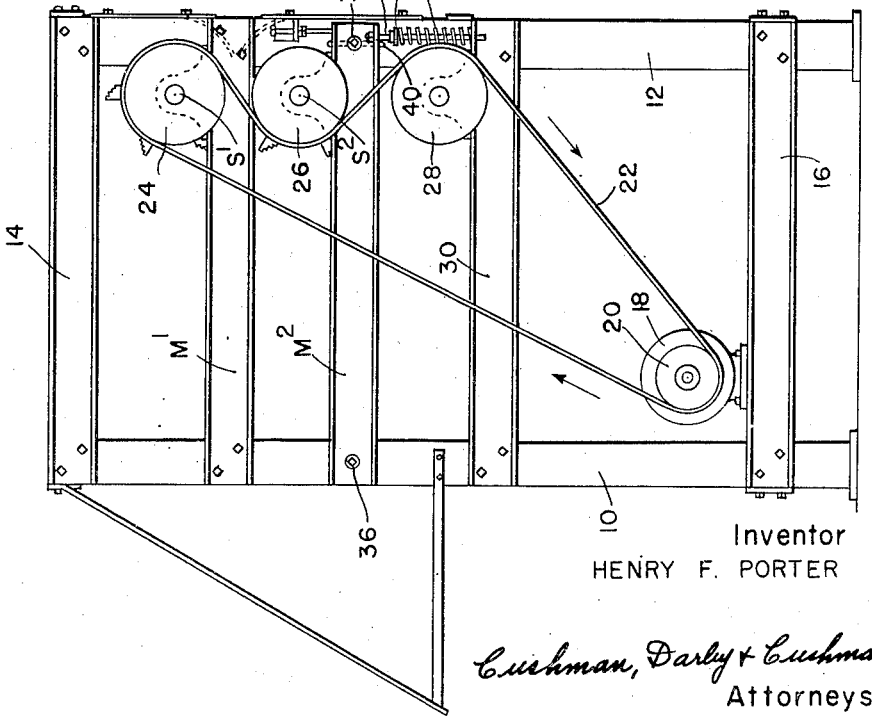
Inventor
HENRY F. PORTER
Cushman, Darby & Cushman
Attorneys Aug. 23, 1949.     H. F. PORTER     2,479,775
APPARATUS FOR DRESSING FOWL
Filed Aug. 15, 1946     2 Sheets-Sheet 2
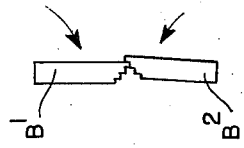
FIG. 7.
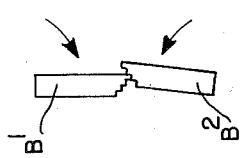
FIG. 6.
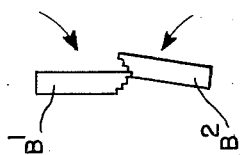
FIG. 5.
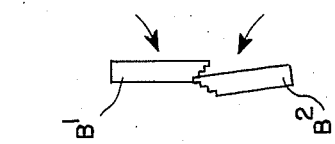
FIG. 11.
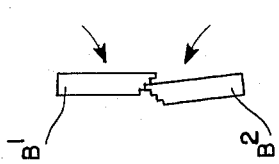
FIG. 10.
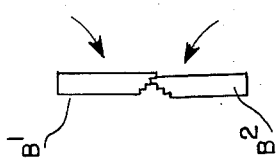
FIG. 9.
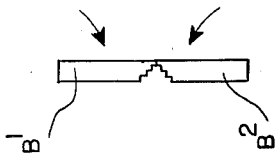
FIG. 8.
FIG. 4.
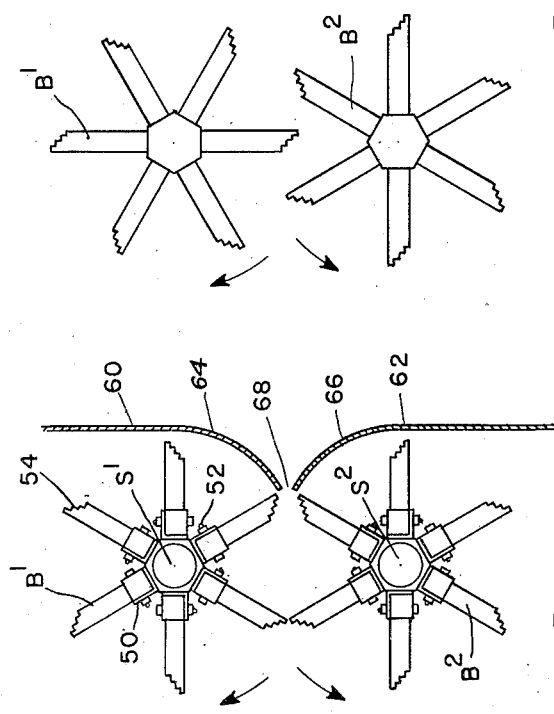
FIG. 3.
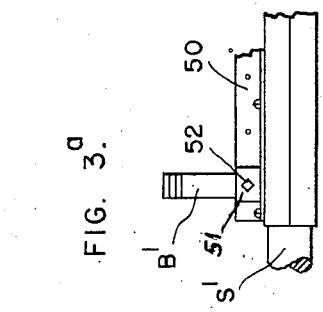
FIG. 3ª.
Inventor
HENRY F. PORTER
Cushman, Darby & Cushman
Attorneys Patented Aug. 23, 1949

2,479,775

UNITED STATES PATENT OFFICE 2,479,775

APPARATUS FOR DRESSING FOWL

Henry F. Porter, Seaford, Del., assignor of one-half to Stephany Poultry Company, a corporation of Delaware Application August 15, 1946, Serial No. 690,749

3 Claims. (Cl. 17—11.1)

The present invention relates to apparatus for cleaning fowl, and particularly the wings thereof, by removing the light feathers as well as the heavy feathers and quills therefrom. A principal object of the invention is to provide such apparatus capable of rapidly cleaning the wings of fowl, as mentioned above, without leaving any remaining feathers or broken ends of feathers or quills on the fowl after the cleaning operation. Ancillary to the preceding objective, I have provided a machine which performs these operations in a rapid and expeditious manner on a so-called "assembly line" basis. In fact, the machine which I have provided is capable of plucking the primary and secondary feathers from approximately 3,000 chickens per hour, it being understood that suitable provision is made continuously or intermittently to convey the poultry to and from the machine on such a conveyor mechanism as an endless chain.

I am aware of the fact that some attempts have previously been made to develop satisfactory machines of this character, but those machines of which I am aware have only been moderately successful. Such machines have consisted of drums or brushes positioned adjacent one another, and which may have radial plucking blades, the opposed ends of which pass tangentially to one another, or intermesh, the fowl being passed between these drums or brushes. Some of these prior art machines, which are specifically intended to clean wings, as in the case of my invention, consist of plucking drums which are in substantial contact with one another, there being suitable indentations on the surfaces of said drums to contribute to the feather removing operations. None of the prior art machines of which I am aware contemplate plucking actions of varying intensity in order to successfully remove the smaller feathers and the larger feathers and quills, either in the above or the reverse order, as provided for by my apparatus. It is therefore an important object of my invention to accomplish the above, and in addition, I intend and have accomplished these operations with great rapidity and without injury to the fowl, while at the same time protecting the hands of the attendants.

I have provided an arrangement of opposed plucking blades which not only are positioned to overlap one another, but are also disposed longitudinally of the shaft on which they are mounted, so that the ends of said opposed plucking blades periodically register and flexibly engage one another at their ends in order to grip between them the heavy feathers and quills and positively pull the same from the wings of the fowl. With these arrangements, means are provided to operate the adjacent rolls whereby opposed plucking blades are out of register or phase during some cycles, and then in register or phase for some cycles, in order to vary the intensity of the operations upon the wings of a fowl. The construction of the blades, and their mounting and operation, is such that they move into and out of register with progressively increasing and decreasing intensity of action on the wings of the fowl, in order to most effectively pluck large and small feathers therefrom.

In connection with the above, it is an object of the invention to provide for the above by the arrangement disclosed herein and by turning the cooperating shafts on which the plucking fingers are mounted, so that the ends of opposed blades pass one another at different speeds, or, by otherwise constructing and arranging the cooperating rolls so that the opposed plucking fingers are alternately in and out of synchronism to vary the cleaning action applied by the machine to the wings.

In the drawings, which are illustrative of one preferred form which the apparatus may take:

Figure 1 is a side elevational view of the machine, showing particularly the manner in which the plucking rolls are driven.

Figure 2 is a front elevational view of the apparatus.

Figure 3 is a partial transverse vertical sectional view through the apparatus showing the relation of the plucking rolls to one another and with respect to the inlet opening through which the wings of the fowl are inserted.

Figure 3a is a detail side view showing a manner of mounting the plucking blades on their shafts.

Figure 4 is a diagrammatic view illustrating the manner in which opposed plucking blades pass one another out of phase during operations of less intensity, i. e., when the smaller feathers are being removed.

Figures 5 through 11, respectively are diagrammatic views of opposed plucking blades as the intensity or strength of plucking is progressively increased and then decreased in accordance with a manner of operation of the invention.

It will be understood that this invention does employ, like a number of the prior art patents, adjacent rolls having radially extending and cooperating fingers which assist in the plucking action. The invention herein resides in the particular manner in which the plucking fingers or blades are arranged and driven to cooperate in the performance of plucking actions of greatly increased effectiveness as compared with that of prior art devices of the general construction referred to.

In Figure 2, the plucking rollers are generally designated as $R^1$ and $R^2$, and they may be mounted on shafts $S^1$ and $S^2$ supported in the frame as now described. As shown in Figure 1, the frame consists of rear upright members 10 and front upright members 12 which may be of the usual metal angle form, and at opposite ends of the frame there are appropriate top and bottom cross bars 14 and 16 respectively. The cross bar 16 is convenient for the mounting of a motor 18 which drives any well-known form of driving mechanism such as a pulley 20, and it is from this pulley 20 that the rolls $R^1$ and $R^2$ are driven as now to be described, through the agency of a belt 22 or other suitable connecting means. A simple pulley and belt construction may be provided, or well-known V belt and pulley devices may be provided with appropriate change spaced characteristics.

Shafts $S^1$ and $S^2$ have connected thereto, at one end of the frame, driven pulleys 24 and 26 respectively, and there is an idler pulley 28 mounted on an additional cross bar 30 at this end of the machine. As shown in Figure 1, the drive belt 22 is rove (in the direction of its rotation, as indicated by appropriate arrows,) over the top of the pulley 24, thence around the left side of the pulley 26 (as in Figure 1) and thence around the right side of pulley 28. With this construction, the rollers $R^1$ and $R^2$ will turn clockwise and counter-clockwise respectively, as viewed in Figure 1 and if a part of a fowl is inserted into the plucking zone or space between said rolls, the opposed and cooperating blades on the rolls will act to remove the feathers from the fowl, or particularly from the wings thereof.

It will be understood that by any suitable arrangement of the relative sizes of the pulleys 24 and 26, or by other means, selected speed variations between the movement of opposed ends of the blades on said rolls may be provided for. For reasons which will be more clearly apparent as the description progresses, it is desired to drive the ends of the blades of one of the rolls at a greater speed than those of the other. In the specific arrangement shown, I have designed the apparatus so that roll $R^2$ is turned at approximately 1180 R. P. M. while the roller $R^1$ is turning at approximately 1140 R. P. M., it being understood that in this case, the working diameters of the opposed rolls are substantially equal.

Upper transverse end bars $M^1$ are fixed to the vertical frame members, and they support the shaft $S^1$ and roller $R^1$ in appropriate bearings for rotation on a fixed axis. Opposite end bars $M^2$ are mounted for vertical adjustment of the lower roll $R^2$ from and toward the upper roll, being pivoted as at 36 to the rear frame members 10. The front ends of the bars $M^2$ carry bolts 38 which are guided in slots 40 in the end faces of the vertical frame members 12, so that bars $M^2$, and with them roll $R^2$, can be adjusted vertically. Any suitable means may be provided to urge bar $M^2$ upwardly and thus the roll $R^2$ upwardly toward the roll $R^1$. As an example, I have shown this accomplished by a vertical rod 41 which depends from and is fixed to the lower flange of the bar $M^2$ and passes for slidable movement through an opening in the upper flange of the bar 30, there being a spring 42 around this rod retained at its upper end by a washer and adjustable nut 44 threaded to the rod and at its lower end by the upper flange of the bar 30. With this arrangement, spring 42 normally urges the roll $R^2$ toward the roll $R^1$. In order to limit the upward movement of the roll $R^2$ and referring to Figure 2, there are brackets 46 carried on the end faces of the upright members 12 and adjustably fixed in said brackets are set screws 48, the lower ends of which bear against the upper flanges 50 of the adjustable bars $M^2$. By means of the set screws 48, the relative radial pressure of the opposed blades on the rolls $R^1$ and $R^2$ may be adjusted to adjust the intensity of action desired on the wings of the fowl. The pressure of spring 42 may be adjusted by nut 44. It will be understood that suitable adjustable tie rods may be provided connecting the opposite bars $M^2$ to insure that the vertical movements of the roll $R^2$ are uniform throughout its length.

Referring to Figures 3 and 3a, each shaft $S^1$ and $S^2$ is formed of hexagonal or other desired geometrical shape in cross section, and on the flat surfaces of the shafts longitudinal angle members 50 are welded, and by means of bolts 52 passing through these angle members, the plucking blades B are attached to the shafts. Adjacent angle members 50 may be welded to one another, as desired. A U-shaped clamp 51 may be used to bolt each blade to the angle bar 50.

In the arrangements shown, I provide for the mounting of six rows of the blades B around each of shafts $S^1$ and $S^2$ longitudinally of each shaft. With blades of about 3 inches in length, and with rolls having an outside working diameter of approximately 8½ inches, the axes of shafts $S^1$ and $S^2$ are adjusted by the screw 48 to be approximately 7¾ inches apart for effective plucking action, the distance between the shafts being adjustable to vary the intensity of the action as necessary.

The blades B may be made of any suitable compositions, but preferably of some plastic substance which is flexible to a moderate degree. The dimensions of the blades may vary, and their form may vary, but in order to contribute to the effectiveness of the plucking action of this invention, a form similar to that now described is preferable. For the action contemplated herein, I have designed the leading edges of the ends of the blades in step formation, as shown at 54 in Figure 3, the step closest to the center of rotation being the leading step in the direction of rotation of the blade in each case. As will be apparent from Figure 3, the length of the blades and their mounting and adjustment is such that they may overlap one another as they turn, there being an overlapping dimension of approximately ¾ of an inch in the arrangement shown. When the rolls are turning, it may be that opposed blades B are at certain times out of phase with one another, in which case the blade of an upper roller may move between the blades of the lower roller (and in the same transverse plane). However, when the blades come into phase, as now to be described, opposed blades may engage one another at their ends, and thus grip the feathers and quills in a firm fashion between them, in order to positively pull these feathers from the fowl.

Suitable means may be provided along the front of the machine to protect the hands of the attendant while he is inserting the wings of a fowl into the plucking space between the rolls. As shown in Figure 3, there are upper and lower metal guard plates 60 and 62 which are bent inwardly as at 64 and 66 in an arc substantially concentric with the circles of rotation of the outer edges of the blades B¹ and B². The arcs of the curved portions of the plates would intersect if extended, but they terminate short of the plucking zone leaving a relatively narrow slot opening 68 which extends along the length of the machine. The plates 60 and 62 may be mounted for vertical adjustment on the vertical supporting members 12 if desired, to regulate the size of opening 68.

The fowl are conveyed along the front of the machine on any suitable means such as a moving cable C having spaced hangers 70 depending therefrom equipped with suitable means 72 for engaging and suspending the fowl head down. As the fowl are moved longitudinally along the front of the machine by the conveyor, the attendant clasps one wing of a fowl in each hand very close to the body and with the back of the fowl presented to the machine, inserts both wings through the opening 68 at any point along the length of the machine. The rolls R¹ and R² are turning at a relatively high speed, and they pull the wings inwardly as soon as contact is made with their tips, while the attendant resists this pull to a slight or variable degree. When the wings have been drawn completely into the machine and when the body of the fowl is in contact with the surfaces 64 and 66, the operator knows that the stripping or cleaning action is substantially completed, and he then pulls the wings outwardly through the opening 68. One relatively rapid inward and outward movement of a fowl into the plucking space between the blades is usually sufficient. It will be understood that the motion of cable conveyor C may be continuous or intermittent, and that the wings of a fowl can be inserted into the machine at any point along the length thereof, or at several points. If not all of the feathers have been removed in one operation, the attendant can again insert the wings into the machine at a later point along the front thereof.

The corresponding or opposed plucking blades B¹ and B² in circular rows of blades on the rollers R¹ and R² are substantially in the same transverse planes through their shafts. (See Figure 2.) As a result of this, and because the spacing of the shafts and the lengths of the blades causes them to engage one another at their ends, cleaning action of varying intensity is provided for, this being further assisted by the drive of the rolls wherein the ends of the blades on one roll move at a slightly greater speed than those of the other.

The cleaning action of progressive increasing and decreasing intensity is illustrated in the successive stages of operation illustrated by Figures 5 through 11. It will be understood that for approximately 6 revolutions at the speeds referred to above, one blade B¹ will be between opposed blades B² when traversing the lower portion of its circle of travel through the plucking zone, as illustrated in Figure 4. After substantially this number of revolutions, the right hand blade B² of Figure 4 will tend to catch up with the opposed blade B¹ on the upper roll and initial cleaning of more intense character will take place when the tip of blade B¹ engages the first or inner step of the end of blade B² as in Figure 5. Previous to this time, and when the blades were passing one another in the manner illustrated in Figure 4, the smaller and least securely attached feathers would have been removed. Beginning with Figure 5, and up to and including the condition illustrated in Figure 8, the tip of blade B¹ in successive rotations moves up the steps of the end of blade B² until the most intense gripping and pulling action of Figure 8 is arrived at. By this time, most of the heavy quills and feathers would have been forcibly pulled from the wings, but there is further pulling action for these heavy feathers, as illustrated in Figures 9 to 11 where the tip of blade B² is shown in effect as walking down the steps of the end of blade B¹ in successive rotations of the two rolls. However, it will be understood that the rolls are turning at relatively high speeds, in fact, speeds of over a thousand R. P. M. may be employed, and as a consequence, the progressive action illustrated in Figures 4 through 11 is of very rapid character. Consequently, all that is apparent to the eye is the simple insertion of the wings with the very rapid stripping of all feathers therefrom, and the action is so rapid that continuous movement of the conveyor chain would not interfere with the operations being carried on. However, movement of this chain will permit the stripping operations to be carried out at any point along the length of the machine, or at several points, as desired.

It will be understood that the plucking blades may be made of rubber or plastic or any other suitable material, but I prefer to make them of a moderately flexible plastic. Of course, when the edges of opposed blades contact one another, as in Figures 5 through 11, and particularly in the positions of 7 through 9, there is a considerable bending of the blades in a direction to the rear of their direction of travel past one another, and such permissible bending is, of course, assisted by the arrangement of steps 54 on the ends of the blades. However, a similar result might be obtained with other shapes at the ends of the blades, including simple tapering surfaces in the direction of the steps at the ends of the blades.

It will be understood, of course, that the arrangement of the blades on their shafts may vary. For example, in each transverse plane through a set of blades, there may be three blades on each shaft, same being arranged alternately on the hexagonal surfaces as shown in Figure 2. In this case, the blades of adjacent circular sets would be staggered with respect to one another, so that the intensity of the pulling operation would vary at different points along the lengths of the shafts. On the other hand, it is within the scope of the invention to have each transverse circular set comprise six blades, or one on each of the hexagonal surfaces of the shaft in that plane, as illustrated in Figure 3, in which case the intensity of pull would be the same at all points throughout the length of the machine at any given time.

As stated, the successive movements of opposed blades through the plucking zone in and out of register or phase depends on the relative speeds of movement of the ends of the blades. In the case of rolls having substantially equal working diameters, this may be accomplished by driving the rolls at slightly different speeds. Of course, like results might be had by having the rolls of slightly different working diameters, as by having some blades of less length than their opposed blades, in which case the desired action would be had even if the respective shafts were driven at the same speed, although in such a case, this would not be essential, as various combinations of the above could be provided for. In fact, different types of treatment could be had on the same machine at spaced points along the length thereof by varying the working diameters (and thus the relative speeds of the ends of the blades) at these points.

To secure proper relative speeds of the two rolls as mentioned above, in the preferred embodiment, where the rolls are of the same working diameter, I simply make the pulley 26 of slightly less diameter than the pulley 24, in order to secure the proper relationships in speed.

I claim:

1. Poultry cleaning apparatus comprising a pair of adjacent substantially parallel rotatable shafts having a plurality of radially projecting plucking blades made of flexible material extending therefrom, said blades being arranged in substantially circular rows around said shafts, a row on one of said shafts lying in substantially the same plane transversely of the length of said shafts as a row on the other shaft, said shafts being so positioned with respect to one another and said blades being of such length that the blades of opposed rows may overlap one another during movement through the plucking zone between said shafts, means for rotating said shafts in opposite directions in such manner that the blades in a row on one shaft move between adjacent blades of a row on the opposite shaft during several rotations of said shafts and thereafter said first-named blades align with and contact at their ends the ends of the blades on the opposite shaft, whereby the plucking action on the part of a fowl inserted between said shafts varies in intensity depending on the relation of said opposed blades in order to alternately strip light feathers and heavy feathers and quills from the fowl.

2. Poultry cleaning apparatus comprising a pair of adjacent substantially parallel rotatable shafts having a plurality of radially projecting plucking blades extending therefrom, said blades being arranged in rows along the lengths of said shafts, and means for rotating said shafts in opposite directions and the ends of said blades thereon at such different speeds that opposed blades on each of said shafts move through the plucking area alternately in and out of phase, whereby the plucking action on a part of a fowl inserted between said shafts varies in intensity in order to alternately strip light feathers and heavy feathers and quills from the fowl.

3. Poultry cleaning apparatus comprising feather plucking rolls of substantially the same working diameter, including a pair of adjacent substantially parallel rotatable shafts having a plurality of radially projecting plucking blades extending therefrom, the blades on one of said shafts being arranged in alignment with the blades on the opposed shaft in planes transverse to the longitudinal axes of said shafts, means for rotating said shafts at relative speeds and for turning one of said shafts at a greater speed than the opposed shaft whereby certain of said blades on one shaft are in substantial radial alignment with certain blades on the opposite shaft for one or more revolutions as said blades sweep by one another through the plucking zone between said shafts, and are out of radial alignment when moving through the plucking zone during one or more subsequent revolutions of said shafts, whereby plucking action on a part of a fowl inserted into the plucking zone between said shafts varies in intensity depending on the relation of said opposed blades in order to alternately strip light feathers and heavy feathers and quills from the fowl.

HENRY F. PORTER.

REFERENCES CITED

The following references are of record in the file of this patent:

UNITED STATES PATENTS

| Number | Name | Date |
|---|---|---|
| 1,809,891 | Dunner | June 16, 1931 |
| 1,950,588 | Anderson | Mar. 13, 1934 |
| 2,027,729 | Hinchcliffe | Jan. 14, 1936 |
| 2,389,404 | Barker | Nov. 20, 1945 |
| 2,422,608 | Albright | June 17, 1947 |
| 2,436,214 | Johnson | Feb. 17, 1948 |